United States Patent

Jones et al.

[15] 3,644,043
[45] Feb. 22, 1972

[54] INTEGRATED INFRARED-TRACKER-RECEIVER LASER-RANGEFINDER TARGET SEARCH AND TRACK SYSTEM

[72] Inventors: Sheldon Jones, Palos Verdes Estates; Raymond W. Briggs, Los Angeles, both of Calif.

[73] Assignee: Hughes Aircraft Company, Culver City, Calif.

[22] Filed: Aug. 11, 1969

[21] Appl. No.: 849,219

[52] U.S. Cl. .................................. 356/5, 250/203, 356/152
[51] Int. Cl. .......................................................... G01c 3/08
[58] Field of Search .................. 356/4, 5, 152; 250/199, 203

[56] References Cited

UNITED STATES PATENTS

| | | | |
|---|---|---|---|
| 2,967,211 | 1/1961 | Blackstone et al. | 178/6.7 |
| 3,204,102 | 8/1965 | Hand | 250/83.3 |
| 3,346,738 | 10/1967 | Rogers et al. | 250/203 |
| 3,480,779 | 11/1969 | Hand, Jr. | 250/203 |
| 3,508,061 | 4/1970 | Hiroshihakata et al. | 250/203 |
| 3,519,829 | 7/1970 | Pradel et al. | 250/216 |
| 3,464,770 | 9/1969 | Schmidt | 356/4 |

Primary Examiner—Rodney D. Bennett, Jr.
Assistant Examiner—N. Moskowitz
Attorney—James K. Haskell and Walter J. Adam

[57] ABSTRACT

For use in a fire control system, a target search and track system to which approximate azimuth and elevation information of the position of a searched target is applied, when the system is in a search mode. The information is used to cause a pointing mirror to point to the target, so that infrared energy is received therefrom, and is reflected to an infrared tracker receiver. Once infrared energy from tee target is received, the system is switched to a track mode in which the position of the pointing mirror is controlled by error signals from the receiver. The receiver includes a detector array and an oscillating, of scanning mirror which, initially, is controlled to scan the array in a wide-angle coarse track mode, in which the array is scanned over a relatively large field of view. When the target is detected near the center of the receiver field of view, the receiver is switched to a small-angle fine track mode, in which the array of detectors is scanned over a much smaller field of view, so that the receiver provides a much higher rate of pointing mirror positioning signals. The positions of the pointing mirror, about two orthogonal axes of rotation, are encoded to provide tracked target azimuth and elevation information, which is supplied to a fire control computer. A laser rangefinder is incorporated, which uses the accurately positioned pointing mirror to reflect laser light to the target and receive laser light, which is reflected by the target back to the system. The laser rangefinder provides the tracked target range information.

7 Claims, 13 Drawing Figures

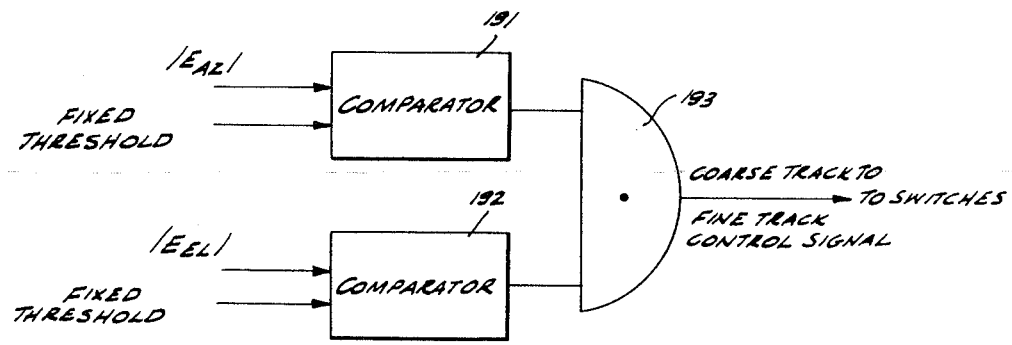
FIG. 10.
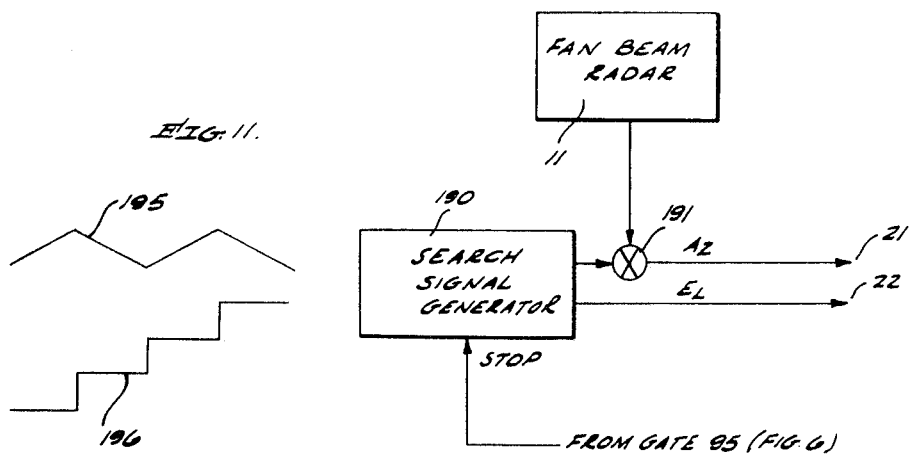
FIG. 11.
FIG. 9.
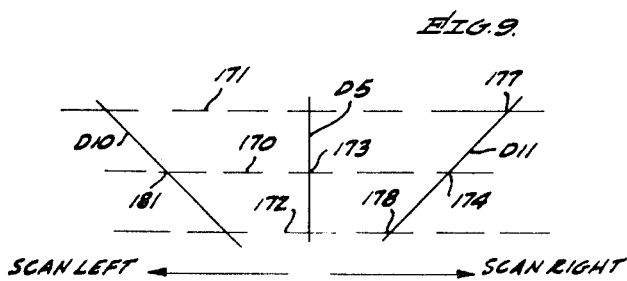

INTEGRATED INFRARED-TRACKER-RECEIVER LASER-RANGEFINDER TARGET SEARCH AND TRACK SYSTEM

BACKGROUND OF THE INVENTION

1. Field of the invention

The present invention relates to a target search and track system and, more particularly, to a target search and track system with infrared tracking and laser ranging means.

2. Description of the Prior Art

Herebefore, in a target search and/or track system, such as is employed in a gun fire control system, radars are employed to search or acquire a target. Once the target is acquired the radars are used to track the target. Typically, the radars tracking the target provide target coordinates such as azimuth (AZ) and elevation (EL) and target range to a fire control computer. The latter computes and provides the signal necessary to control the panting of guns as to hit the target. Two basic disadvantages characterize such a system. The first disadvantage is that the precision of the tracking information, provided by such radars, is limited. Consequently, target hit probability is low. Another disadvantage is that radars are vulnerable to electronic jamming, particularly after the target senses that is being tracked. Thus, a target, with sophisticated electronic jamming or countermeasures (CM), may completely disable the fire control system. Such disadvantages can only be eliminated, or greatly minimized, by providing a target search and track system which provides higher accuracy of tracking information, and one which is less vulnerable to electronic jamming, particularly after target acquisition. The latter capability can only be provided by a target tracking system which is covert, i.e., it does not transmit electromagnetic energy in order to track the target, so that it does not "reveal" its own position.

OBJECTS AND SUMMARY OF THE INVENTION

It is a primary object of the present invention to provide a new and improved target search and track system.

Another object is to provide a new target search and track system with increased accuracy of target tracking information.

A further object of the present invention is to provide a target search and track system which is less vulnerable to electronic jamming than prior art systems.

Still a further object of the invention is to provide a new target search and track system in which radars may be employed for target searching only, with target tracking being provided by means other than radars, which are less vulnerable to electronic jamming and which provide high accuracy tracking information.

Theses and other objects of the invention are achieved by providing a system which includes an infrared tracker receiver and a laser rangefinder. The general direction of the target may be acquired either automatically, such as by means of a search and track radar, or manually, by optical sighting. A system backup mode of operation is also incorporated, enabling target acquisition to be accomplished by means of a search radar only and the infrared tracker receiver, which is initially operated in a search mode.

Once target acquisition is achieved, the target is angle tracked by the infrared tracker receiver which controls the positioning of an optical system so that the infrared energy or IR from the target is detected in the center of the IR receivers field of view. The angular position of the optical system is encoded and resolved to provide target azimuth and elevation signals. A laser rangefinder, which is boresighted to the IR tracker receiver, provides target range information. The optical system, the position of which is controlled by the IR tracker receiver, is also used to point the laser to the target, thereby providing the high pointing accuracy which is required for the laser rangefinder.

The target azimuth, elevation and range information may be supplied to a fire control computer for gun or missile control.

The azimuth and elevation information, obtained with the IR tracker receiver is much more accurate and less noisy than the same information derived from a radar tracker. Also, the IR tracker receiver, since it does not transmit electromagnetic energy to achieve target tracking, is less vulnerable to electronic jamming or other CM techniques. The laser rangefinder does transmit electromagnetic energy but it need not be used in a continuous fashion until just before gun firing. Also, it does not "broadcast" except over a very small angle, less than 1 milliradian, thereby making its detection for jamming purposes most difficult.

The novel features of the invention are set forth with particularity in the appended claims. The invention will best be understood from the following description when read in conjunction with the accompanying drawings.

BRIEF DESCRIPTION OF THE DRAWINGS

FIGS. 3–10 are diagrams useful in explaining the operation of an infrared tracker receiver, shown in FIG. 2;

FIGS. 11 and 12 are diagrams of circuitry used for target searching by means of the infrared tracker receiver.

DESCRIPTION OF THE PREFERRED EMBODIMENTS

Figure 1:
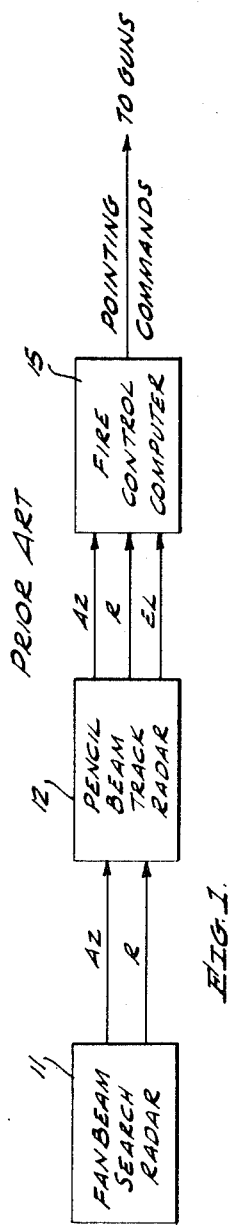
FIG. 1 is a simple block diagram of a conventional, prior art fire control system.

Reference is now made to FIG. 1 which represents a prior art fire control system. Typically, in such a system a fan beam search radar, designated by block 11 and a pencil beam-track radar, designated by block 12, are employed to search or acquire the target, as well as track it. The fan beam radar provides target azimuth (AZ) and range (R) information to the pencil beam track radar, which in turn provides, target azimuth, target elevation (EL) and target range information to a fire control computer 15. The computer 15 uses this information in its computations and provides pointing command signals to guns which fire at the tracked target. These signals may be used to direct a missile to the tracked target.

As previously pointed out, such a system suffers from at least two basic disadvantages. These include limited target tracking accuracy by the radars and their vulnerability to countermeasures, such as electronic jamming. These disadvantages are eliminated or at least greatly minimized by the novel system of the present invention. In accordance with the teachings of this invention, in some modes of the system's operation it is assumed that a target is searched by some external means until its approximate position is acquired. Position information of the acquired target, generally in the form of target azimuth (AZ) and target elevation (EL) are then supplied to the novel system to cause a pointing mirror to point to the general direction of the target, and receive energy which is either radiated by the target or reflected therefrom. The system is assumed to be operating in a search mode when the position of its pointing mirror is controlled by the externally supplied target position information.

Once sufficient energy is received by the system to indicate the detection of an actual target, the system is switched to a track mode in which the position of the pointing mirror is controlled by error signals, generated by an infrared (IR) tracker receiver. This receiver is operable in a coarse track mode as long as the error signals which are generated by it are above selected threshold levels. However, once the error signals fall below these threshold levels, the IR receiver is switched to a fine track mode to accurately track the target.

The position of the pointing mirror is measured to provide accurate target azimuth and elevation information. The system also incorporates a laser rangefinder which uses the accurately positioned pointing mirror to direct light to the target and receive reflected light therefrom. The laser rangefinder provides target range information, The target azimuth and elevation information, as a function of the pointing mirror position and the target range information from the laser rangefinder may be supplied to a fire control computer which computes and provides gun pointing commands.

The novel system of the present invention may be operated in any one of several different modes in order to obtain the approximate or general azimuth and elevation information of a searched target, which once acquired is tracked by the system as will be explained hereafter in detail.

The novel system may be operated in a normal target acquisition mode in which the general azimuth and elevation information of a target is acquired by radars, such as the fan and pencil beams radars. The system may also be operated in a manual target acquisition mode, in which the target is acquired by manual optical sighting. The coordinates of the gimbal of the optical device, such as a telescope, used for sighting, may be utilized to provide the initial azimuth and elevation information, necessary for target acquisition. The system may further be operated in a backup target acquisition mode of operation in which the IR receiver is used for target acquisition, as well as thereafter for target tracking. In any one of these modes the approximate or general azimuth and elevation of an acquired target are obtained. The terms approximate or general as used herein in connection with the target azimuth and elevation intend to indicate that the azimuth and elevation are sufficient to define the general position of a target so that a mirror or other optical means may be made to point to it, but are not sufficient to accurately define the target position for gun control purposes.

Figure 2:
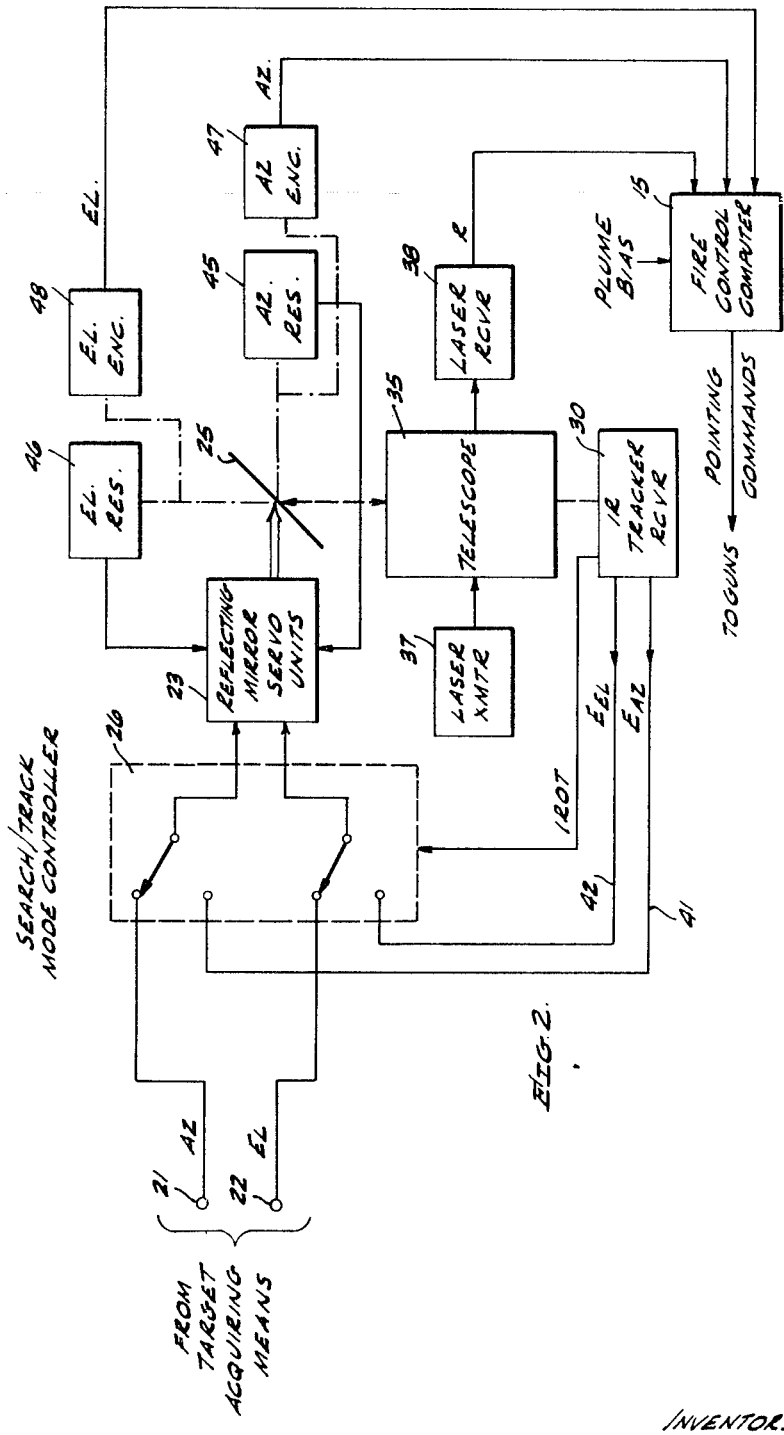
FIG. 2 is a general block diagram of the novel system of the present invention.

Reference is not made to FIG. 2 which is a simple block diagram of the present invention. Therein, numerals 21 and 22 designate two input terminals, at which the approximate azimuth and elevation angles of an acquired target are assumed to be supplied from target acquiring means. As pointed out in the normal target acquisition mode these means comprise conventional radars, such as the fan and pencil beam radars 11 and 12, shown in FIG. 1. The terminals 21 and 22 are connected to servo units 23 of a rotatable pointing mirror 25, through a Search/Track mode (STM) controller 26. Initially, the system is in the search mode so that the azimuth and elevation information of the acquired target, present at terminals 21 and 22, are supplied to servo units 23. These units adjust the position of mirror 25 about two orthogonal axes of rotation using the measured gimbal positions provided by AZ and EL resolvers 45 and 46 so that the mirror is in position to receive energy from the acquired target.

Infrared energy or IR received from a target is directed by the mirror 25 to an IR tracker receiver 30 through a telescope 35. The same telescope and mirror 25 are used to direct light from the laser transmitter 337 to the target, and to receive light, which is reflected by the target back to the system and direct it to a laser receiver 38. The laser transmitter-receiver combination serve as a laser rangefinder, providing target range, R, which in a fire control system is supplied to the fire control computer 15.

As will be described hereafter in detail, the IR tracker receiver 30 upon receiving sufficient IR energy from a target to indicate the detection of an actual target, produces an IR ON Target (IROT) signal which is supplied to the STM controller 26, causing the latter to switch to a track position or mode, in which two output lines 41 and 42 of receiver 30 are connected to servo units 23. These lines are used to supply the servo units 23 with azimuth and elevation error signals designated $E_{AZ}$ and $E_{EL}$, which are produced by receiver IR, as a function of the detection of the target by detectors in the receiver, at other than the center of its field of view. The servo units 23 use these mirror signals to adjust the position of mirror 25, such as by rotating it about two axes of rotation, so that the IR energy is directed to the center of the receiver field of view.

As previously stated, the IR receiver is initially operated in a coarse track mode in which the receiver field of view is relatively large. Once the error signals $E_{AZ}$ and $E_{EL}$ fall below selected threshold levels the receiver is switched to a fine track mode in which a much higher rate of tracking information is produced, thereby enhancing the system's target tracking capability.

The position of the tracked target is determined in azimuth and elevation by measuring the position of the pointing mirror 25 about its two axes of rotation, by means of the digital encoders 47 and 48, which are designated as the AZ encoder and the EL encoder, respectively. The outputs of the encoders 47 and 48 are used to determine the azimuth and elevation of the tracked target, which in FIG. 2 are shown supplied to the fire control computer 15.

Form the forgoing it should be appreciated that in the system of the present invention irrespective of the manner in which a target is searched and acquired once it is acquired, and its azimuth and elevation information is provided to the system, the actual tracking of the target is accomplished by the IR receiver to provide accurate target azimuth and elevation information. Range information of the tracked target is provided by the laser rangefinder. Since the need for radars for target tracking is completely eliminated, the system of the present invention is much less vulnerable to electronic jamming. Also, in terms of tracking, the azimuth and elevation information which is obtained with the IR tracker receiver is more accurate and less noisy than the same information derived with a conventional radar tracker.

Figure 3:
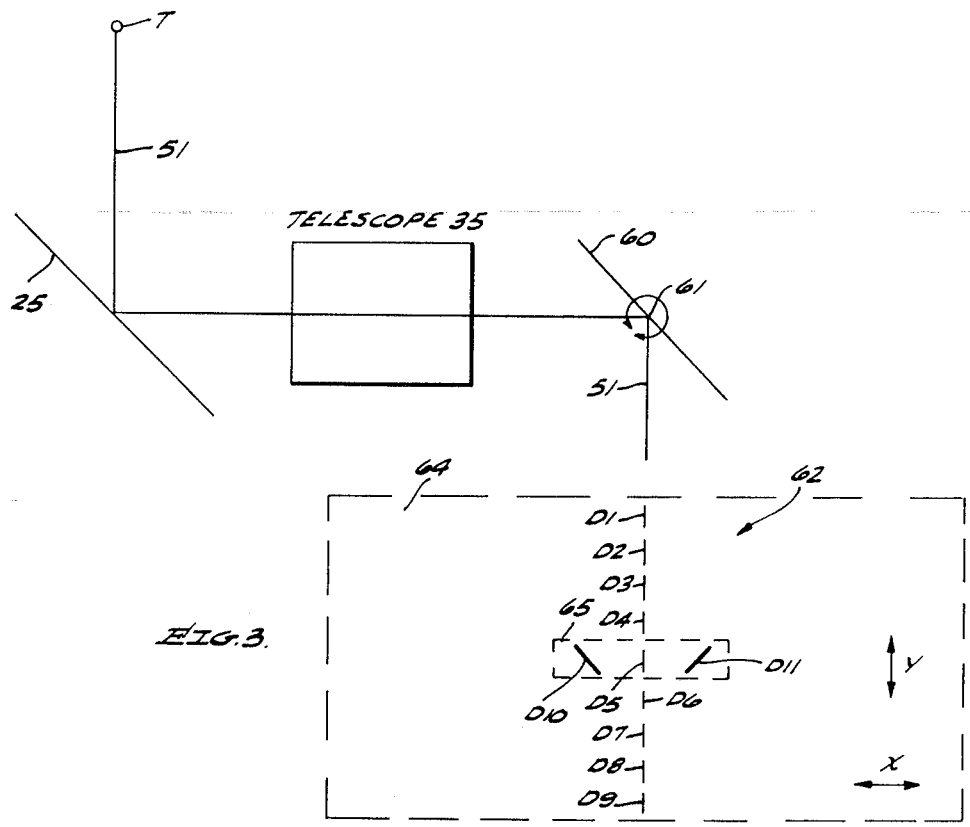
Figure 4:
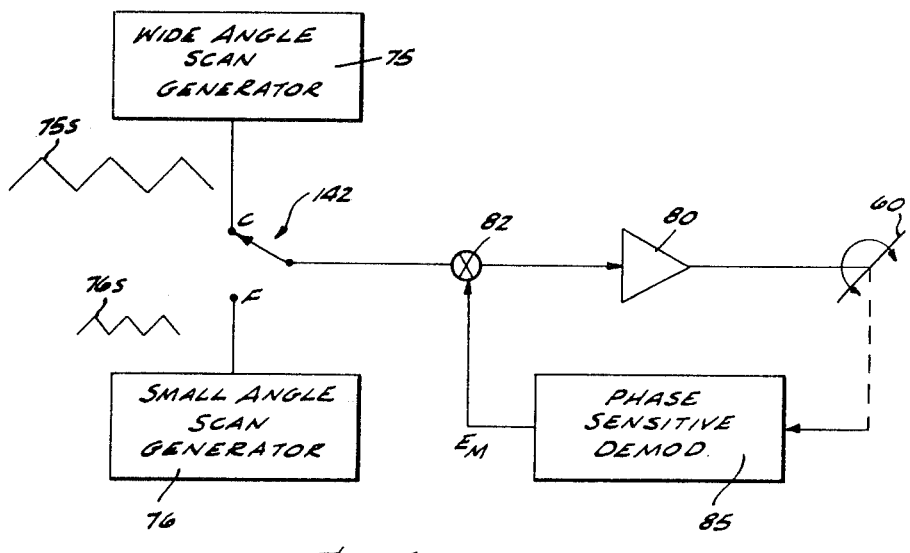

The manner in which the IR receiver operates in its coarse and fine track modes may best be explained in conjunction with FIGS. 3–10. These figures are used to diagram circuits, necessary for the receiver's operation. The circuits are presented as examples of the type of circuitry necessary for the receiver's operation rather than to limit to the specific examples. In FIG. 3, T represents an acquired target from which IR energy 51 is received by the pointing mirror 25. As previously stated, the target's initial position information provided to the system is used to position mirror 25 so that the IR energy is directed by the mirror through telescope 35 to the IR receiver 30.

The receiver includes an oscillating or scanning mirror 60 to which the IR energy from the telescope is directed. The scanning mirror oscillates or rotates about an axis 61. If desired, the mirror 60 may be though to be part of the telescope. The receiver includes a detector array 62 which is located at the telescope focal plane, so that the IR energy is focused onto a spot on or near the detectors, forming the array.

The array includes a linear array portion of an odd number of detectors, such as 9, designated D1 through D9, the center detector being D5. The number of detectors in the linear array is typically odd and not less than three. In addition to the nine detectors in the linear array, a pair of chevron detectors, designated D10 and D11, are positioned on opposite sides of the center detector, D5.

In FIG. 3, dashed line 64 designated a coarse track field through which the array of detectors is scanned back and forth when the mirror 60 is scanned over a wide angle, which is the case when the receiver is operated in a coarse track mode. Dashed line 65 represents a fine track field through which the array is scanned back and forth when the receiver is operated in the fine track mode. The detector array 62 is placed in the receiver 30 so that the detectors D1–D9 lie in the focal plane of the telescope and in a direction parallel to the axis of rotation 61. However, for explanatory purposes only in FIG. 3 they appear to lie in a plane perpendicular to axis 61.

Basically, it is assumed that when the system is first turned on the receiver operates in the coarse track mode. After the mirror 25 is initially positioned to reflect IR from the target T to the scanning mirror 60, the array is scanned through the coarse track or wide-angle field 64 and IR from the target is sensed by one of the detectors in the array. The scanning mirror 60 may be thought of as going through a null or zero position during each scanning cycle. For the particular arrangement, shown in FIG. 3, it should be appreciated by those familiar with the art that only when the mirror 25 is perfectly positioned about an axis, perpendicular to the plane of the figure, will IR from a target be detected by one of the detectors when the scanning mirror 60 is at its null or zero position. In such a case the target is detected at or near the center of the field.

If however, the mirror 25 is at other than such a position, the IR from the target will be sensed by one of the detectors in the linear array when the position of the mirror 60 is other than its null position. Thus, the position of the scanning mirror, when the target is detected by one of the detectors in the linear array, is an indication of the error in the position of the reflecting mirror 25 with respect to its normal zero azimuth position, which is at 90° to the telescope axis. This angle of the scanning mirror which is represented by X may be thought of as an error in azimuth (AZ) or simply as azimuth error $E_{AZ}$. It should be further appreciated, that the particular detector in the linear array which senses the target is an indication of an error in the position of mirror 25 about its vertical (in the plane of paper) axis of rotation, which is designated in FIG. 3 by array Y. This error may be thought of as error in elevation (EL), or simply an elevation error, $E_{EL}$.

As will be described hereafter in detail, the IR receiver 30 includes circuitry to generate voltages which are indicative of the scanning mirror 60 positions. These voltages are then utilized to derive the errors in both azimuth and elevation which are supplied to the servo units 23 to adjust the position of the mirror 25 with respect to its two axes of rotation, and cause the target energy to be detected near the center of the field of view.

The receiver 30 is assumed to include a wide-angle scan generator 75 (see FIG. 4) and a small-angle scan generator 78 which produce sawtooth signals, designated 75s and 76s, respectively. The two signals are of equal slopes or rat is except that they differ in amplitude and, consequently, in frequency. It is the output of either one of these generators which is supplied to an amplifier 80 through an adder 82. The output of the amplifier is used to control the rotation of the mirror 60 to cause it to scan the detector array. When the output of generator 75 is supplied, the scanning mirror 60 scans the array back and forth through the wide field 64 (see FIG. 3), while scanning the same array back and forth through the smaller field 65, when the output of generator 76 is supplied to the amplifier.

Since the position of the scanning mirror 60 is measured by an AC transducer, a phase sensitive demodulator 85 is incorporated to provide an DC output, designated $E_M$, which is supplied to the adder 82. The magnitude of $E_M$ indicates the relative position of the scanning mirror 60 with respect to its null position, while the polarity of $E_M$ indicates the direction with respect to the null position.

Figure 5:
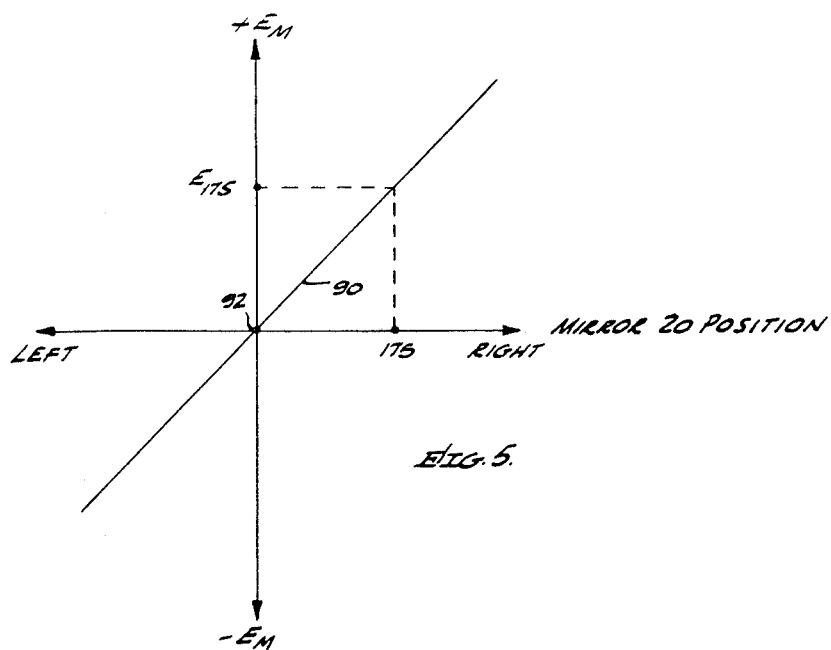

The relative magnitude and polarity of $E_M$ as a function of mirror 60 position are diagrammed in FIG. 5 and are represented by the straight line 90. From FIG. 5 it should thus be appreciated that $E_M$ increases in amplitude as the position of scanning mirror 60 increases from its null position. The signal $E_M$ is of a first polarity, such as positive (+), when the scanning mirror is to the right of its null position while having a negative (−) polarity when the mirror is to the left of its null position. The null position is represented in FIG. 5 by numeral 92.

Figure 6:
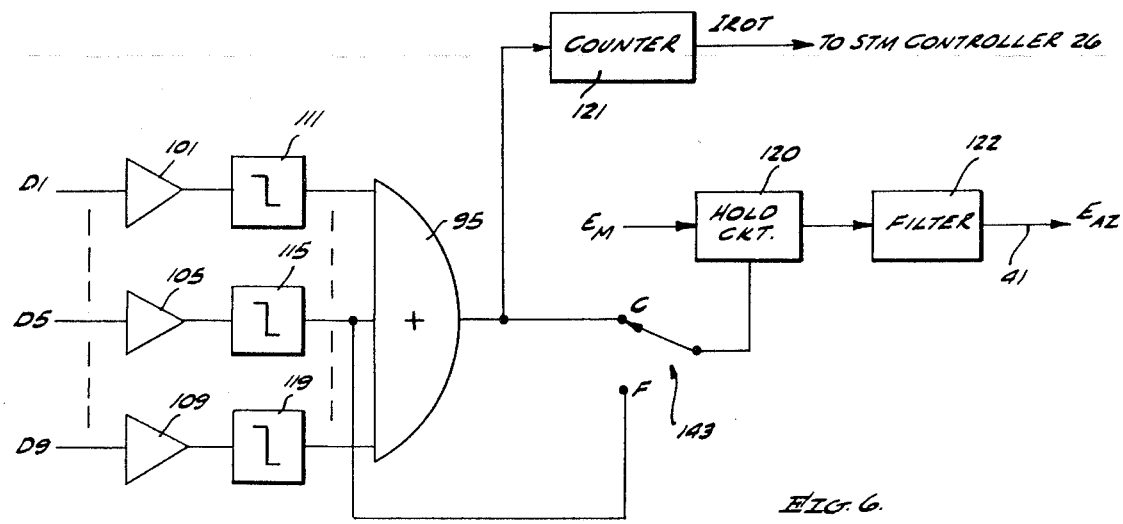

Reference is now made to FIG. 6 which is a simplified block diagram of circuitry capable of producing the azimuth, $E_{AZ}$ in the IR receiver incorporated in the present invention. As shown, each of the nine detectors D1–D9 in the linear array has associated therewith an amplifier and a threshold circuit. The outputs of the threshold circuits are connected to an OR-gate 95. For simplicity, only amplifiers 101, 105 and 109 and threshold circuits 111, 115 and 119, associated with detectors D1, D5 and D9 respectively, are shown. In the coarse track or wide-angle mode, the output of the OR-gate 95 is supplied to hold circuit 120 to which the voltage $E_M$ is supplied.

The output of OR-gate 95 is also supplied to a counter 121. This counter is incremented by one each time gate 95 is enabled. When several successive energy detections are sensed by the detectors, thereby indicating that a real target provides the IR energy, the count in the counter reaches a selected value and it provides an IR ON Target (IROT) pulse which is supplied to the STM controller 26, switching the latter to the track mode. In this mode it is the error signals from the IR receiver 30 which are used to control the position of mirror 25. Thus, the function of the counter 121 is to insure that switching from the system search mode to the track mode occurs when sufficient IR energy is received by the receiver's detectors from a real target. To insure that spurious noise does not contribute to the production of the IROT signal, the counter 121 may preferably include a circuit which resets the counter if greater than a selected interval elapses between outputs of OR-gate 95.

Whenever a target is sensed by any of the nine detectors and its output exceeds the threshold of its associated threshold circuit, the OR-gate 95 is enabled, triggering the hold circuit 120 to hold or store the $E_M$ voltage. Thus, the voltage in the hold circuit indicates the scanning mirror position at the time of detection. This voltage, after filtering by a filter 122, represents the position error in the track mode this error signal is supplied to the servo units 23 via line 41 to adjust the position of mirror 25 about its perpendicular axis of rotation, to bring the target to the center of the field in the X-axis. It should be clear that, since in the fine track or small-angle mode the field includes only detectors D5, D10 and D11, in this mode, the azimuth error is produced by the output of D5. Thus, in this mode it is the output of circuit 115 which is supplied to trigger the hold circuit 120.

From the foregoing it should be appreciated that for the determination of $E_{AZ}$, at least in coarse track mode, it is not significant which of the detectors in the linear array senses the target, since the nine detectors are in a line perpendicular to the scanning axis (X) along which the error is detected. This however, is not the case when the error in the Y-axis or in elevation, $E_{EL}$ is to be determined. Such error is directly related to the detector which senses the target and the position of the detector in the linear array. It is apparent from FIG. 3 that if the target T is detected by D1 it indicates a maximum $E_{EL}$ in a first direction from the center, while a maximum $E_{EL}$ in the opposite direction is indicated when D9 detects the target.

Figure 7:
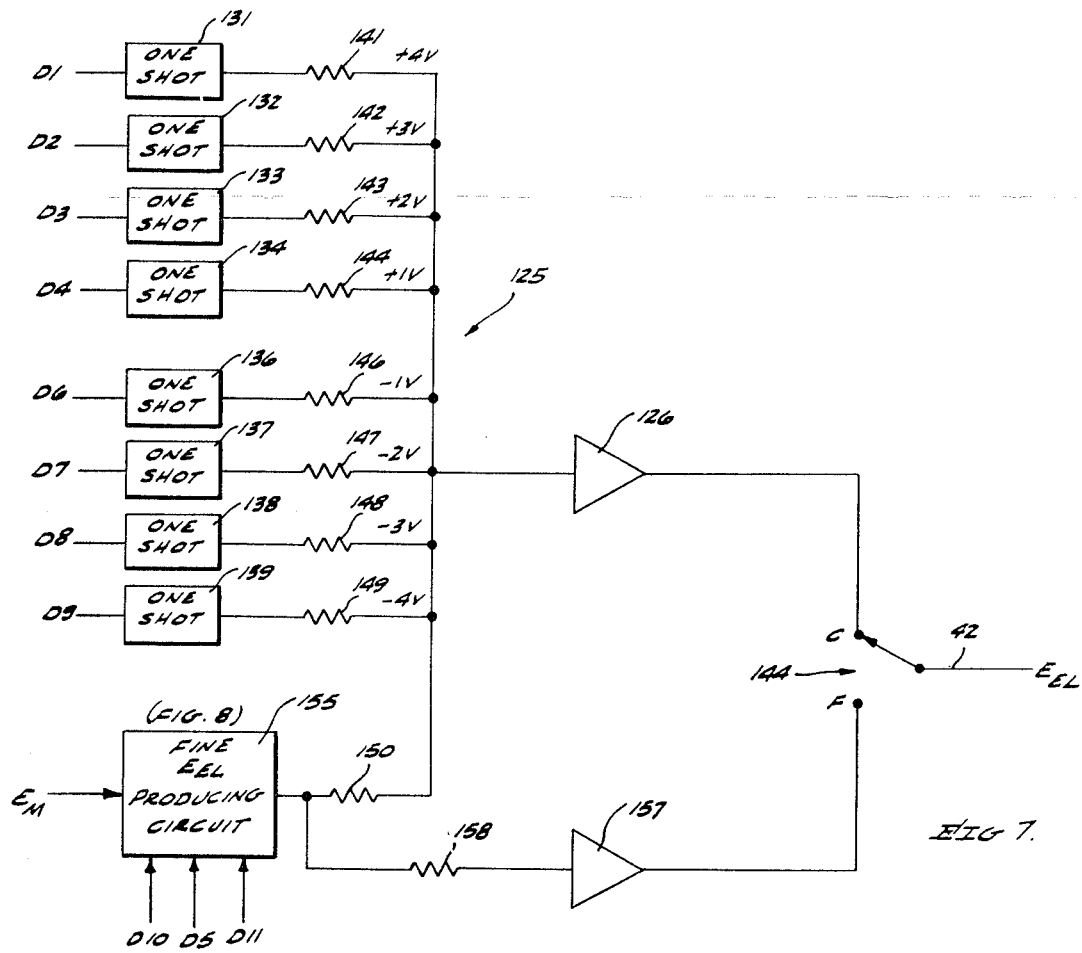

The elevation error, $E_{EL}$ may be produced by a circuit, as shown in FIG. 7. Basically, in the elevation-error-producing circuit, the output of each of detectors D1–D4 and D6–D9 is connected through a one shot to a corresponding resistor in a weighted resistor matrix 125, which is connected to the input of an amplifier 126. The output of the amplifier 126 represents $E_{EL}$ in the coarse track mode. The eight one shots are designated 131–134 and 136–139, while the resistors are designated by numerals 141–144 and 146–149.

Figure 8:
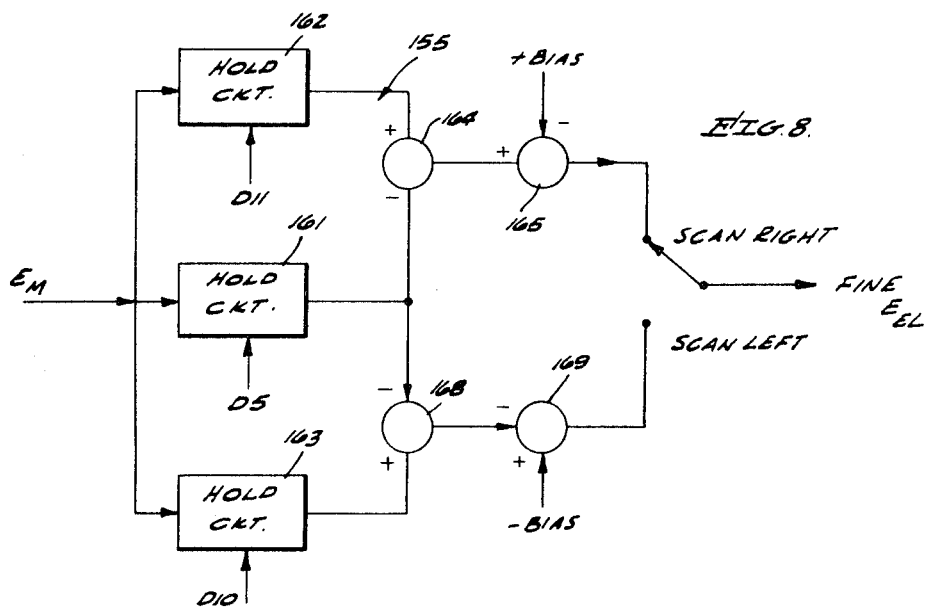

Also forming a part of the matrix is a resistor 150, which is connected to a fine elevation error-producing circuit 155, which is diagrammed in detail in FIG. 8. Ignoring for a moment circuit 155, the resistor matrix 125 is weighted so that the amplitude and polarity of the voltage to amplifier 126 indicate which of the eight detectors D1–D4 and D6–D9 senses the target, thereby indicating the $E_{EL}$ magnitude and polarity or sense with respect to the field center. For example, the matrix may be weighted so that when D1 senses the target, +4 volts are supplied to the amplifier, while −4 volts are supplied when the target is sensed by D9. Also, +3 volts and −3 volts are produced when the target is detected by D2 and D8, respectively, +2 volts and −2 volts when D3 and D7, respectively sense the target, while +1 volt and −1 1 volt are produced when the target is sensed by D$ and D6, respectively.

The output, $E_{EL}$ of this circuit is assumed to be supplied to servo units 23 (FIG. 2) to rotate the mirror 25 about its vertical axis of rotation to reduce the elevation error until the target is detected by the center detector D5. It is circuit 155 which generates $E_{EL}$ when the target is detected by D5. Its (circuit 155) output is supplied and combined in the resistor matrix 125 to insure that in the coarse track mode, the elevation error $E_{EL}$ is continuously reduced until the target is detected by D5. In the fine track or small-angle mode it is the output of circuit 155, after amplification by amplifier 157, which represents $E_{EL}$. Amplifier 157 is connected to circuit 155 through a resistor 158.

Reference is now made to FIG. 8 which is a simple diagram of circuit 155. The circuit is shown to include three hold circuits 161, 162 and 163 which are independently triggered by the outputs of D5, D11 and D10 when the latter sense a target, to store or hold $E_M$ supplied thereto. The voltage held in 161 is subtracted from the voltage held in 162, by a subtractor 164. The subtractor output is supplied to a second subtractor 165. In 165, a fixed bias voltage is subtracted from the output of subtractor 124 and the resultant is the fine $E_{EL}$ when the scanning mirror 60 scans the field to the right.

In an analogous arrangement the voltage in 161 is subtracted in a subtractor 168 from that in hold circuit 163. A negative bias voltage is supplied to a subtractor 128 is subtracted from the negative bias voltage. It is the output voltage of subtractor 169 which represents the fine $E_{EL}$, when the scanning mirror 60 scans the field to the left.

The operation of the circuit 155 may best be explained in conjunction with FIG. 9 which is an expanded view of detectors D5, D10 and D11, and in conjunction with FIG. 5 which, is the $E_M$ vs MIRROR POSITION graph. In FIG. 8, dashed line 170 represents zero elevation error, line 171 represents a positive $E_{EL}$ in which the target is detected above the field center, and line 172 represents a negative $E_{EL}$, in which the target is detected below the field center, Let it be assumed for a moment that the azimuth error, $E_{AZ}$ is zero, that $E_{EL}$ is zero and that the mirror 60 scans to the right. In such a case when the target is detected by D5, at point 173, $E_M$ is zero, since zero azimuth error is assumed. However, when the target is detected by D11 at point 174, $E_M$ is not zero. Rather, it equals a voltage depending on the fixed distance between points 173 and 174 and, therefore, the voltage is a function of the degree of angular rotation of the scanning mirror 60 which is required from its null position to direct the target to D11. Let it be assumed that this mirror position is as indicated by point 175 in FIG. 5. Consequently, when D11 detects the target at point 134 when $E_{EL}$ is zero, $E_M$ is positive and is equal to $E_{175}$. For explanatory purposes let $E_{175}$=+4 volts. In such a case the fixed bias voltage which is applied to subtractor 165 (FIG. 8) is +4 volts.

With the foregoing assumptions it should be seen that when the target is detected by D5 at point 173 $E_M$=0. Thus, 0 volts are held in circuit 161. Then when the target is detected by detector D11 at 174, $E_M$=+4 volts. Consequently, +4 volts are held in circuit 162. Therefore, the output of subtractor 164 is +4−(+0)=+4 volts. However, due to the +4 volts bias voltage which is applied to subtractor 165, the output of the latter is +4−(+4)=0 volts, thereby indicating zero elevation error.

If, however, a positive elevation error is present (see line 171 in FIG. 9), when the target is detected by D11 at point 177, $E_M$ is greater than +4 volts. Consequently, the output of subtractor 164 is greater than the +4 volts bias, applied to 165. As a result, a net positive voltage is produced. The magnitude and polarity of this voltage indicate the magnitude and sense or direction of elevation error $E_{EL}$. Likewise, if a negative elevation error is present (see line 172 in FIG. 9), when the target is detected by D11 at point 178, $E_M$ is less than +4 volts. Consequently, the output of subtractor 164 is less than +4 volts, so that when the +4 volts bias is subtracted therefrom in 165, a negative voltage is produced, indicating a negative elevation error.

The performance of the hold circuits 161 and 163 and subtractors 168 and 169 is fully analogous, for providing the fine $E_{EL}$, when scanning is to the left. Basically, the negative bias voltage which is applied to subtractor 169 is chosen to equal $E_M$ when the target is detected by D10 at point 181, in the absence of an elevation error, so that the net output of subtractor 169 is zero. In the particular example, this negative bias voltage is −4 volts.

Herebefore, it has been assumed that the azimuth error, $E_{AZ}$ is zero. It should be pointed out that any azimuth error which may be present does not affect the production of the fine elevation error. An azimuth error causes hold circuit 161 to store an $E_M$ equal to other than zero, when the target is detected by detector D5. However, the value of the $E_M$ stored in either circuit 162 or 163, depending on the scan direction, is shifted by an equal magnitude, which after subtraction by subtractor 164 or 168 cancels out. Thus, any azimuth error has no effect on the fine $E_{EL}$, which circuit 155 is capable of providing.

In operation, when the system is first turned on it is in the Search mode so that the azimuth and elevation information of the acquired target are supplied to the servo units 23. At the same time the receiver 30 is in the coarse track mode. When sufficient IR energy is detected within a selected interval, thereby indicating that the energy is from a real target, the counter 121 provides the IROT signal. As a result, controller 26 (FIG. 2) switches the system to the track mode. During this period the receiver operates in the coarse track or wide-angle mode, as represented by the positions of switches 182, 183 and 184, shown in FIGS. 4, 6 and 7, respectively. The mechanical switches are presented as a simple example of devices for switching the receiver from the coarse track mode to the fine track mode. It is clear, however, that in practice, such mechanical switches may be too slow and that electronic switching would be employed. In these switches, when the switch arms are in contact with the C terminals, the coarse track mode is performed, while in the fine track or small-angle mode the arms are in contact with the F terminals.

When the receiver is in the coarse track mode, the output of generator 75 (FIG. 4) is used to rotate the mirror 60 to scan the detector array back and forth over the wide or coarse track field 64 (FIG. 3). Azimuth error, $E_{AZ}$ is produced by the circuit, shown in FIG. 6, while elevation error, $E_{EL}$ is produced by the circuit shown in FIG. 7. These errors are supplied to the servo units 23, via lines 41 and 42 respectively (FIG. 2), to adjust the position of mirror 25 to direct the target to the field center. Only when both errors fall below selected threshold levels, is the receiver 30 switched to the fine track or small-angle mode. The positions of mirror 25 about its axes of rotation are encoded by encoders 47 and 48 which provide highly accurate coordinate information of the tracked target.

The signal which is necessary to switch the receiver 30 from the coarse track mode to the fine track mode may be provided by the output of a circuit, shown in FIG. 10, to which reference is now made. Basically, the circuit may include two comparators 191 and 192 to which the absolute values of $E_{AZ}$ and $E_{EL}$ are respectively supplied. In each, the error is compared with a fixed threshold level. The outputs of the two comparators are connected to an AND-gate 193. Only when both errors fall below the threshold levels with which they are compared is gate 193 enabled, to provide a coarse track to fine track switching control signal, to the various switches.

Once the receiver is switched to the fine track or small-angle mode, the field is limited to that shown in FIG. 3 by line 65. In this fine track mode the azimuth error is provided by the output of hold circuit 120 (FIG. 6) when the target is detected by detector D5, while the elevation error is derived by the output of circuit 155 (FIG. 8), as a function of the mirror positions, represented by $E_M$, at the times of target detection by detectors D5, D10 and D11.

In the foregoing, only the circuitry in the receiver 30, which is used in its coarse and fine tracking modes has been described. This circuitry is sufficient when target acquisition is accomplished by either conventional radars which is regarded as the system normal target acquisition mode, or by manual optical sighting, which is regarded as the system manual target acquisition mode. In either of these two modes, signals, representing the azimuth and elevation of the acquired target, are applied to terminals 21 and 22 (FIG. 2) to position the mirror 25, so that energy from the target is directed to the receiver 30, to enable it to first track the target in the coarse track mode and, thereafter, in the fine track mode.

As previously pointed out, the system of the present invention may further be operated in a system backup target acquisition mode, in which the IR receiver 30 participates in target acquisition. To provide such a capability the system of the present invention includes additional circuitry which may best be explained in conjunction with FIGS. 11 and 12. Basically, for the backup target acquisition mode of operation, the system includes a search signal generator (SSG) 190 (FIG. 11), an adder 191 and a three position switching arrangement 192 (FIG. 12), which replaces the two position switching arrangement 142, shown in FIG. 4.

In the system backup mode, the switching arrangement 192 is in contact with a terminal S (for search) rather than with either terminal C to which the wide-angle scan generator 75 is connected, or with terminal F to which the small-angle scan generator 76 is connected. A null position bias source 193 is connected to terminal S, to provide a null position bias voltage, such as 0 volts, so that in the system backup mode, during target search or acquisition, the mirror 60 is prevented from oscillating, and is held stationary at its null position.

The Search signal generator (SSG) 190 generates two signals with different waveforms. One signal, designated by numeral 195, has a sawtooth waveform, while the other, designated by numeral 196, has a staircase waveform. Generators like the SSG 190 are will known in the radar art, in which they are used when bar searching techniques are employed.

In the present system the sawtooth signal 195 is combined, in adder 191, with an azimuth signal from the conventional fan beam radar, which is assumed to acquire the target and provide an approximate target azimuth position. The output of the adder 191 is supplied to terminal 21 (FIG. 2). Thus, this output causes the pointing mirror 25 to move back and forth in azimuth about a point generally defined by the azimuth signal from the fan beam radar. As the mirror 25 scans the general target position in azimuth, the staircase signal 196 is applied, as an elevation signal, to terminal 22. This signal causes the mirror 25 to step in elevation as it scans the target position in azimuth. It should again be stressed that during this target searching operation the scanning mirror 60 is stationary, and it is pointing mirror 25 which is rotated in azimuth and stepped in elevation until the target is acquired in its field of view, and IR energy from the target is detected by one of the detectors in receiver 30. Such target detection is represented by an output from OR-gate 95 (FIG. 6).

In accordance with the teachings of the invention, the first output of the OR-gate 95 is used to stop the target searching operation by providing a STOP signal to the SSG 190. The output of the OR-gate 95 may also be used to provide the switching arrangement 192 (FIG. 12) with a control signal to switch from the S-terminal to the C-terminal and thereby cause the scanning mirror 60 to start scanning the detector array in the coarse track mode.

As previously pointed out, spurious noise may activate one of the detectors which may result in a single output of OR-gate 95. In order to prevent such a single output from indicating an acquired target, counter 121 (FIG. 6) is incorporated. When the IR receiver 30 is used for target searching it may be desirable to include a simple circuit to reactivate the the SSG 190 and switch arrangement 192 (FIG. 12) back to terminal S, if one output from gate 95 is not followed by a second output within a selected interval. Any one of conventional design techniques may be employed in the implementation of such a circuit to provide the reactivating signal. Thus, if as a result of noise or other undesired source OR gate produces a single output which is not due to the detection of IR energy from a real target, since such a single output will not be followed by another output, the SSG 190 will be reactivated to continue the Search operation until a real target is detected.

From the foregoing it should be appreciated that irrespective of the system mode for acquiring the target, once a target is acquired, tracking is performed by the IR receiver 30. Initially, the receiver operates in a coarse track mode. Then, when the target is tracked and detected near the center of the array, the receiver is switched to a fine track mode, in which a much smaller field of view is scanned. Consequently, a much higher rate of tracking data is produced thereby increasing the accuracy with which the pointing mirror 25 is positioned. Thus, highly accurate position information of the track target is providable by the system of the present invention. The azimuth and elevation information of the track target are provided by the encoders 47 and 48. When employed in fire control system, the azimuth and elevation information is supplied to the fire control computer 15, which in turn computes and provides pointing commands for guns, aimed to hit the tracked target.

Since the receiver 30 tracks a target by detecting IR energy received therefrom, it is estimated that the IR receiver will track a hot point in the target plume at a small distance behind the target's tailpipe. The displacement of this point from the vulnerable area of the target may be calculated by the fire control computer 15. The latter may be supplied with a plume bias signal to compensate for the distance between the track point on the target behind its tailpipe and its vulnerable area.

Attention is now directed once more to FIG. 2. Therefrom, and from the foregoing description it should be appreciated that the pointing mirror 25 and the telescope 35 are used to direct light from the laser transmitter 37 to the target and receive light reflected therefrom and direct it to the laser receiver 38, in addition, to their use in directing IR energy, received from the target, to the IR receiver 30. The use of a single telescope and a single pointing mirror 25 are preferable since they represent the minimum which is required to direct IR energy from the tracked target to the receiver and laser light from the transmitted to the target and, therefrom, back to the receiver. Also, by utilizing the single pointing mirror 25 which is made to point to the tracked target with a very high degree of accuracy, the high accuracy, required for pointing the laser light for rangefinding purposes is attained.

The use of laser transmitter-receiver combinations for laser rangefinding are well known in the art, and therefore the laser transmitter and the receiver will not be described in any further detail. However, an example of the optics of a single telescope, such as telescope 35, which is used for the direction of laser light from the transmitter to the target, and light received therefrom to the laser receiver, as well as directing IR energy from the pointing mirror 25 to the receiver 30 will now be described.

Figure 13:
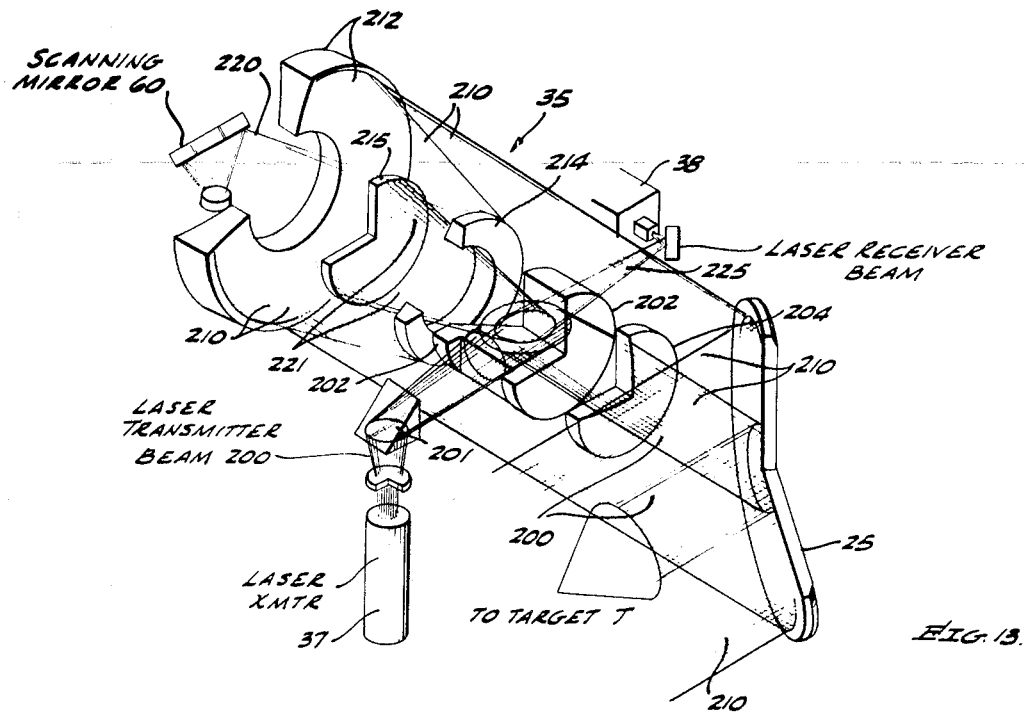
FIG. 13 is an optical schematic diagram of a telescope, shown in FIG. 2.

Reference is now made to FIG. 13 which is an optical schematic diagram of the telescope 35. Selected portions of optical elements of the telescope have been removed in order to clearly indicate the paths of energy therethrough. Therein, elements, previously referred to are designated by like numerals. Basically, a beam of light, designated by numeral 200, which is provided by the laser transmitter 37 is reflected by means of a prism 201 to a prism element 202 in the telescope 35. The beam is then directed through the telescope-focusing lense 204 to the pointing mirror 25, which points the laser transmitter beam 200 to the target T. The same pointing mirror 25 is used to receiver both IR energy and light from the target. The combined light and IR energy are represented in FIG. 13 by lines designated by numerals 210.

The combined light and IR energy are reflected by the mirror 25 to a telescope-concave reflecting member 212. The detector array 22 of the receiver 30 is assumed to lie in the focal plane of member 212. The IR energy and the light from a member 212 are reflected by a telescope optical element 214 towards a dichromatic filter element 215. The function of the latter is to separate the IR energy from the laser light by permitting the former to pass therethrough to the scanning mirror 60. In FIG. 13, the IR energy is represented by numeral 200.

While the filter 215 permits the IR energy to be directed therethrough to the scanning mirror 60 it reflects the light, which is directed thereto, through an opening in the optical element 214, to the prism 202 for reflection to the laser receiver 38. In FIG. 13, numerals 221 designate the light reflected by filter 215, while the laser light beam received by the receiver 38 is designated by numerals 225. From FIG. 13 it should thus be apparent that the telescope 35 comprises a single barrel telescope which is used to reflect a laser beam, provided by the laser transmitter 37, to the target T, as well as to receive both reflected light therefrom and IR energy. By the utilization of the filter 215 the two types of energy are separated, with the IR energy being directed to the scanning mirror 60, while the laser light is reflected to the laser receiver 38.

The foregoing description may thus be summarized as comprising a novel system in which target tracking is accomplished by means of an IR receiver to provide accurate tracked target position information, such as azimuth and elevation. The system further includes a laser rangefinder, consisting of a laser transmitter and laser receiver, which are used to provide tracked target range information. Preferably, a common or single telescope and a single pointing mirror are used to direct the laser light from the laser transmitter to the target, as well as to receive, both reflected laser light and IR energy, provided by the target. The IR receiver is operable in a coarse track mode in which a first rate of tracking data is supplied until the target is tracked and detected near the center of the field of view of a detector array in the IR receiver. When such detection is accomplished, the IR receiver is automatically switched to a fine track mode of operation in which a much higher rate of tracked target position information is provided, to greatly increase the target tracking accuracy.

In terms of tracking, the tracked target position information which is produced by the novel system of the present invention is significantly more accurate and less noisy then similar information derived from conventional radar target trackers. Also, the novel system of the present invention is less vulnerable to electronic jamming since it is substantially covert, i.e., it does not transmit electromagnetic energy in tracking the target and, therefore, it does not reveal its own position. As previously indicated the laser rangefinder does transmit electromagnetic energy. However, it need not be operated in continuous fashion during tracking. Rather, it may be turned on just before gun firing. Also, the radiation of the energy is over a very small angle, generally, less than 1 milliradian. Thus, the detection and the jamming of such a laser rangefinder represents a most difficult problem.

As is appreciated from the foregoing description, for the novel system of the present invention to operate, the general or approximate position information, such as azimuth and elevation of the searched or acquired target must be provided thereto. In the system normal target acquisition mode of operation, such information is assumed to be supplied from conventional fan and pencil beam radars. In the manual acquisition mode, such information is assumed to be supplied from gimbal angles of a manually positionable optical sighting device. Thus, the present invention may be used with radars which are employed only for searching and acquiring a target in the system's field of view. If however, such radar is not operable for some reason, such as for example due to electronic jamming or other counter measures, the system may be operable by manual target acquisition.

Figure 12:
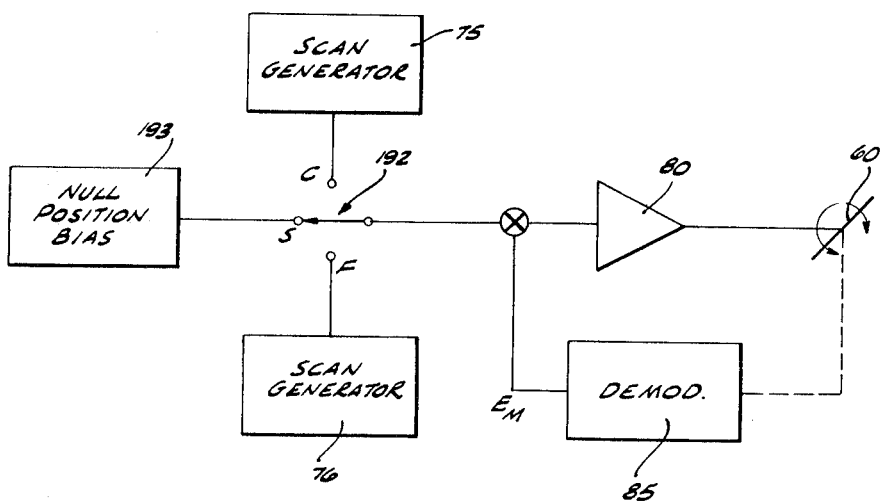

As previously explained in conjunction with FIG. 11 and 12, the novel system of the present invention may be operated in a system backup target acquisition mode, in which the system itself is used for target acquisition or searching, as well as for target tracking. In the backup mode, it is assumed that azimuth information of an acquired target is provided, such as from a fan beam search radar. In this mode, the system is operated to use this information (see FIG. 11) in searching for the target, by controlling the position of the pointing mirror 25, until IR energy from the target is detected by the IR receiver from the system. Once the target is detected, the system continues to perform its tracking function as in either of the other two system modes of target acquisition, namely, the normal target acquisition mode or the manual target acquisition mode.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A target search and track system comprising:
   mode control means for controlling said system to operate in either a search mode or a track mode;
   optics means for controlling the direction of transmission and reception of energy and including a positionable optical member;
   position control means for controlling the position of said optical member;
   means for receiving signals indicative of the position of a target to be tracked and for applying said signals to said position control means, when said system is in said search mode, to control the position of said optical member;
   receiving means coupled to said optics means and including an array of infrared energy detectors and a scanning mirror and means for controlling the scanning of said detectors by said scanning mirror to be over a wide field of view when the infrared energy is detected by one of said detectors at a point outside a selected area from the center of said field of view and for controlling the scanning of said detectors by said scanning mirror to be over a small field of view when the infrared energy is detected at a point from the center within said selected area;
   means for applying a switching control signal to said mode control means from said receiving means to switch said system to operate in said track mode when infrared energy from said target is detected by said receiving means;
   means for applying positioning signals to said position control means from said receiving means when said system is in said track mode to control the position of said optical member so that infrared energy is detected by said receiving means at the center of a field of view thereof;
   means for measuring the position of said optical member; and
   laser rangefinding means for directing laser energy to said target through said optics means and for receiving laser energy reflected by said target therethrough to provide target range information.

2. The arrangement as described in claim 1 wherein said optics means includes a single telescope and said optical member comprises a single energy reflecting mirror, said telescope including means for directing infrared energy, which is received from said target and which is reflected to the telescope by said single mirror, to said receiving means, said telescope further including means for directing laser light from said laser rangefinding means to said mirror for reflection to the target and means for directing laser light, reflected back by the target to the mirror to said laser rangefinding means.

3. In combination with a fire control computer of the type providing pointing commands as a function of azimuth, elevation and range information of a tracked target supplied thereto, a target search and track system comprising:
   mode control means for controlling said system to operate in either a search mode or a track mode;
   optics means including a positionable optical member;
   position control means for controlling the position of said optical member;
   means coupled to said optics means for receiving signals indicative of the position of a target to be tracked and for applying said signals to said position control means, when said system is in said search mode, to control the position of said optical member to direct infrared energy to said receiving means;
   receiving means coupled to said optics means and including an array of infrared energy detectors and a scanning mirror and means for controlling the scanning of said detectors by said scanning mirror to be over a wide field of view when the infrared energy is detected by one of said detectors at a point outside a selected area from the center of said field of view and for controlling the scanning of said detectors by said scanning mirror to be over a small field of view when the infrared energy is detected at a point from the center within said selected area;

means for applying a switching control signal to said mode control means from said receiving means to switch said system to operate in said track mode when infrared energy from said target is detected by said receiving means;

means for applying positioning signals to said position control means from said receiving means when said system is in said track mode to control the position of said optical member so that infrared energy is detected by said receiving means at the center of a field of view thereof;

means for measuring the position of said optical member and for providing said fire control computer with target azimuth and elevation information, as a function thereof; and laser rangefinding means for directing laser energy to said target through said optics means and for receiving laser energy reflected by said target therethrough to provide target range information to said computer.

4. The arrangement as described in claim 3 wherein said optics means includes a single telescope and said optical member comprises a single energy reflecting mirror, said telescope including means for directing infrared energy, which is received from said target and which is reflected to the telescope by said single mirror, to said receiving means, said telescope further including means for directing laser light from said laser rangefinding means to said mirror for reflection to the target and means for directing laser light, reflected back by the target to the mirror, to said laser rangefinding means.

5. A target search and track system comprising:

mode control means for controlling said system to either operate in a search mode or to operate in a first or a second track mode;

optical means for transmitting and receiving energy and for directing the direction in space of which energy is transmitted or received;

position control means coupled to said mode control means for controlling the position of said optical member;

means coupled to said optical means for receiving signals representative of the position of a target to be tracked and for applying said signals to said mode control means to control the position of said optical member;

receiving means coupled to said optical means and including an array of infrared energy detectors and a scanning mirror and means for controlling the scanning of said detectors over a wide field of view for said first track mode or over a small field of view for said second track mode;

means responsive to infrared energy being detected by said receiving means for applying a switching control signal to said mode control means from said receiving means to switch said system for operation in either said first or said second track mode;

means for applying position signals to said position control means from said receiving means when said system is in said track mode to control the position of said optical member so that infrared energy is detected by said receiving means substantially at the center of a field of view thereof; and laser rangefinding means coupled to said optical means for directing laser energy to said target and for receiving laser energy reflected by said target therethrough to provide target range information.

6. The combination of claim 5 wherein said optical means comprises a single energy reflecting mirror structure for receiving energy reflected from said target and for directing laser energy transmitted to said target and for receiving laser energy reflected back from said target.

7. A system for searching in a search mode and tracking a target in a first tracking mode or a second tracking mode comprising:

optical means including a positionable optical member for controlling the direction of receiving infrared energy and the direction of transmitting and receiving of laser energy;

mode control means coupled to said position control means for controlling said system to operate in either said search mode or in one of said first and second tacking modes;

a source of searching signals coupled to said mode control means to direct said optical member when said system is in said search mode;

receiving means coupled to said optical means and to said mode control means to control the position of said optical member when said system is in said track mode, said receiving means including an array of infrared energy detectors and scanning means for controlling the scanning of said detectors with the infrared energy received by said optical means so as to respectively provide during operation in said first and second tracking modes a wide field of view or a narrow field of view of the target area as a function of the position that the energy is detected relative to the pointing direction of said optical member;

means coupled between said receiver means and said mode control means for applying switching control signals thereto as a function of the detection of infrared energy so that said system operates either in said search mode or in one of said first and second track modes; and laser rangefinding means coupled to said optical means for directing laser energy to said target through said optical means and for receiving laser energy reflected from said target therethrough to provide target range information.

* * * * *